United States Patent [19]

Widditsch

[11] Patent Number: 4,523,357
[45] Date of Patent: Jun. 18, 1985

[54] HOOK ASSEMBLY

[76] Inventor: H. Robert Widditsch, 3233 NE. 105th, Seattle, Wash. 98125

[21] Appl. No.: 532,541

[22] Filed: Sep. 15, 1983

[51] Int. Cl.³ .................. A43C 11/08; A01K 39/00
[52] U.S. Cl. .................. 24/230.5 R; 24/230.5 AD; 119/51 R; 248/317; 248/544
[58] Field of Search .............. 24/230.5 R, 230.5 AD; 248/544, 317, 339, 340, 359; 119/51 R, 52 R; 294/19 R

[56] References Cited

U.S. PATENT DOCUMENTS

| | | | |
|---|---|---|---|
| 326,616 | 9/1885 | Woodburny et al. | 24/230.5 R |
| 577,220 | 2/1897 | Whitehead | 294/19 R |
| 703,178 | 6/1902 | Bye | 248/544 |
| 1,127,987 | 2/1915 | Green | 248/317 |
| 1,351,379 | 8/1920 | Gillett | 248/317 |
| 2,245,126 | 6/1941 | Day | 248/317 |
| 2,362,137 | 11/1944 | Kagan | 248/317 |
| 2,566,446 | 9/1951 | Gomer | 119/51 R |
| 3,346,222 | 10/1967 | Cech | 248/544 |
| 3,495,797 | 2/1970 | Ganz | 248/339 |
| 4,030,451 | 6/1977 | Miller | 119/51 R |
| 4,102,308 | 7/1978 | Kilham | 119/52 R |
| 4,441,458 | 4/1984 | Mercil | 119/51 R |

Primary Examiner—Victor N. Sakran
Attorney, Agent, or Firm—Christensen, O'Connor, Johnson & Kindness

[57] ABSTRACT

A hook assembly for suspending a bag or other member from an overhead support, such as a tree limb in a safe manner and with the use of only one hand, includes a hook and a hood adapted to slide up and down the shank of the hook. The hood serves as an umbrella to prevent rain, dust and other foreign matter from falling into the bag. An elongate downwardly open socket is integrally formed with, and extends along the slope of, the outer surface of the hood. The socket is sized to receive the upper end of a pole used to lift the hook assembly up to an overhead limb or remove the hook assembly from the limb. The hook assembly also includes a lock mechanism for maintaining the hook engaged with the limb. The lock mechanism is automatically actuated by the movement of the hood as it slides up and down along the hook shank.

10 Claims, 5 Drawing Figures

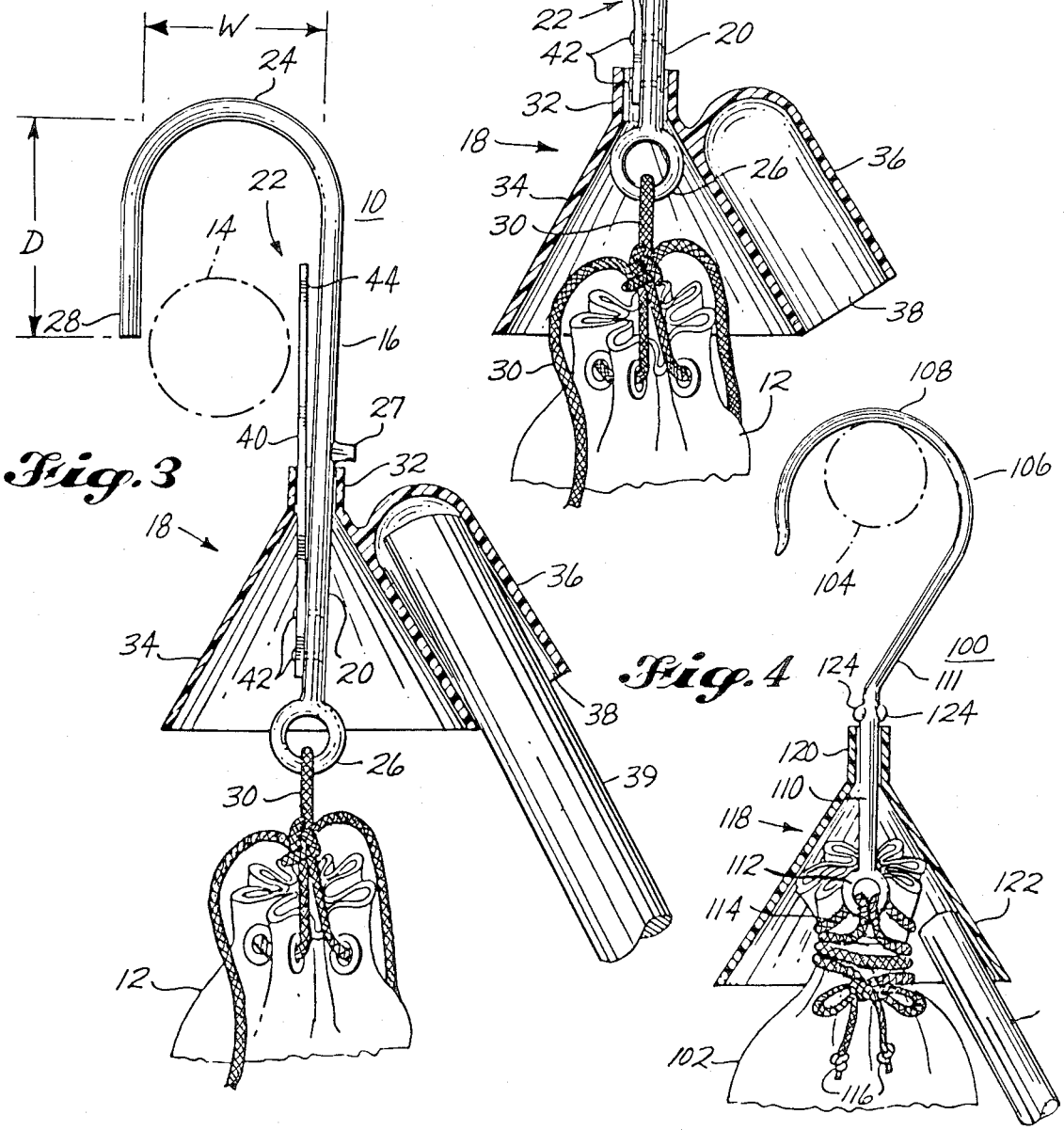

HOOK ASSEMBLY

This invention relates to a hook capable of being conveniently engaged with and disengaged from a remotely located support member, and more particularly to a hook assembly for attaching a camper's food bag to an overhead member such as a tree branch while also preventing rain, rodents and other foreign matter and wildlife from entering the bag.

BACKGROUND ART

Experienced campers and backpackers commonly store all of their food in a bag and then use a rope or cord to suspend the bag from a high tree limb out of reach of deer, bears, and other animals. For safety reasons, the tree picked for this function is usually located somewhat removed from the sleeping place of the campers so that animals attracted by the scent of the food will not endanger the sleeping campers. The bag is typically hung in the tree by first tying the free end of the cord to a heavy object, such as a rock or piece of wood and then throwing the weighted cord over a tree limb. Then the bag is hoisted and the free end of the cord tied to a lower branch or around the trunk of the tree. This procedure is awkward and time consuming since it is difficult to accurately throw the weighted cord around the chosen tree limb, especially after dark, the typical time of performing this operation. Moreover, the above described method of placing the cord over the tree branch can be dangerous since the rock or branch tied to the end of the cord can ricochet off the tree trunk or a limb and strike the person standing below. This danger is even greater at night when the camper is not able to see the falling weight.

In addition to the problems discussed above, squirrels, chipmunks, mice and other animals not uncommonly climb down the cord and eat the food stored in the bag. If necessary, these animals will chew their way into the bag to get at the food. Also, birds and other animals perch on top of the bag and drop their feces into the bag to contaminate the food therein. Rain, dust and other unwanted matter also easily enter the bag even if it is closed with a drawstring.

DISCLOSURE OF INVENTION

The present invention relates to a novel hook assembly for attaching a bag, line or other object to a remotely located support member. In basic form the hook assembly is comprised of a hook having an elongate shank section extending longitudinally downwardly from an arcuate end section, and an eye section fixedly attached to the lower end of the shank section to receive, for instance, the drawstring of a food bag. Preferably, the outer surface of the hook is smooth to prevent animals from climbing down the hook and into the bag.

The hook assembly also includes a generally umbrella-shaped hood having a central opening for receiving the hook shank section to enable the hood to slide along the length of the shank section. The hood includes a central collar having an inside opening slightly larger than the size of the hook shank section and a skirt which flares downwardly from the central collar to serve as a shield to prevent rain, dust and other foreign matter from entering into the food bag. Ideally, the hood is constructed from smooth, slippery material to prevent it from being used as a perch by birds and rodents.

An elongated, downwardly open socket member extends longitudinally along the exterior of the hood skirt. The socket member is sized to receive the upper end of a walking stick, tree limb, tent pole, ski pole, ice-axe or any similar item to enable the user to conveniently lift the hook assembly upwardly and engage the hook around an overhead branch. Because only one hand is needed for this operation, the user's other hand is free to hold a flashlight or lantern. Any reasonable diameter stick, limb, or other item can be used to install and retrieve the hook.

A lug member extends transversely outwardly from an upper portion of the hook shank section to serve as an upper stop to limit the upward movement of the hood when the hook assembly is being lifted upwardly with a pole. Also, the eye section of the hook extends transversely outwardly from the hook shank section to serve as a lower hood stop to prevent the hood from downwardly disengaging from the shank section.

The hook assembly further includes a lock for maintaining the hook attached to an overhead limb. The lock includes an elongate, curved tongue member having a lower end fixedly attached to a lower portion of the hook shank section. The upper end of the tongue member is normally disposed adjacent the tip of the hook curved end member to thereby maintain the hook locked in closed position. However, when the hood is slid upwardly toward the upper stop by the pole used to lift the hook assembly, the hood central collar will push the tongue member against the hook shank section causing it to assume a straight shape, thus leaving the hook curved end member open so that it can be conveniently placed around a tree branch. However, once the hook has been engaged with the tree branch and the pole removed from the hood socket, the hood is urged downwardly along the hook shank section by the spring as it automatically returns to its normally curved shape. When this occurs, the tongue member again closes off the hook curved end section to thereby prevent the hook from disengaging from the tree limb even if the limb is tossed up and down by the wind.

A hook assembly constructed according to the present invention provides the advantage that it can be conveniently and quickly installed at a remote location with the use of only one hand. The ease of using the hook assembly makes it less likely that campers and backpackers will neglect the chore of hanging their food bag out of reach of bears and other animals. As a consequence, the likelihood of damage to equipment, loss of food, or bad experiences with bears, is reduced.

BRIEF DESCRIPTION OF THE DRAWINGS

FIG. 1 is an isometric view of a typical hook assembly constructed according to the present invention shown suspending a bag from a tree limb;

FIG. 2 is an enlarged side elevational view of the typical hook assembly illustrated in FIG. 1 with the hood and its associated socket member shown in cross section;

FIG. 3 is another enlarged, side elevational view of the typical hook assembly illustrated in FIGS. 1 and 2, specifically showing the position of the hood when hanging or removing the hook assembly with a pole;

FIG. 4 is a side elevational view of another typical hook assembly constructed according to the present invention with the hood shown in cross section and pushed upwardly against its upper stop by a pole or stick used to install or remove the hook assembly; and, FIG. 5 is a side elevational view of a further embodiment of a typical hook assembly constructed according to the present invention wherein the hood, shown in cross section, is constructed from flexible material.

BEST MODE OF THE INVENTION

Figure 5:
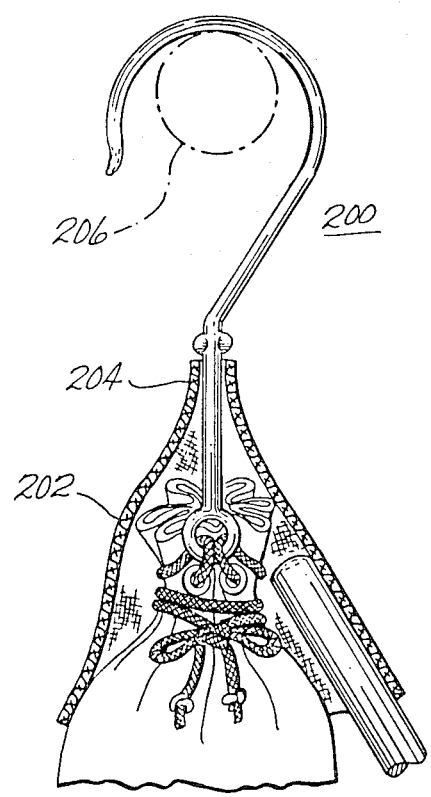

Referring initially to FIGS. 1 and 2, hook assembly 10 constructed according to the best mode of the present invention currently known to applicant is shown as supporting a container in the form of bag 12 from the limb 14 of a tree. Hook assembly 10 includes a hook 16 and a hood 18 adapted to slide up and down the shank 20 of the hook to cover the closed upper end of bag 12. Hook assembly 10 also includes a lock 22 for maintaining hook 16 attached to limb 14 even if limb 14 and bag 12 are tossed up and down by the wind.

Now referring additionally to FIG. 3, hook 16 is illustrated as including a curved end 24 and an elongate, straight shank 20 extending downwardly from the curved end to terminate at a closed, circular eye 26 disposed in the same plane as defined by curved end 24.

A lug 27 extends transversely outwardly from a central portion of shank 20 to serve as an upper head stop to limit the upward travel of hood 18 along shank 20. The portion of curved end 24 disposed opposite shank 20 includes a straight tip 28 which extends downwardly from the curved end in spaced parallel relationship to shank 20. The length of tip 28 is preferably long enough to form curved end 24 with a depth D that is greater than its inside width W which ideally is wide enough to enable hook 16 to extend around limbs and branches which are strong enough to hold most food bags but not so large that hook assembly 10 occupies an excessive proportion of the volume of a backpack. As an illustrative but not limiting example, the inside width W of hook 16 could be from approximately $1\frac{1}{2}$ to $2\frac{1}{2}$ inches.

Hook 16 may be made from any high strength material, with the type of material depending on the load to be carried by the hook. It is anticipated that for typical camping and backpacking requirements, hook 16 may be constructed from plastic material. Ideally, the outer surface of hook 16 should be smooth so that animals, such as rodents, cannot climb down the hook. Moreover, although hook 16 is illustrated as formed with a circular cross section, other cross-sectional shapes, such as square or rectangular, can also be utilized.

As best shown in FIGS. 2 and 3, a circular, closed eye 26 is integrally formed with the lower end of hook shank 20. Eye 26 has a circular opening for receiving the cord or drawstring 30 of bag 12. Once threaded through eye 26, the ends of drawstring 30 can be simply tied together to thereby attach bag 12 to hook assembly 10. Eye 26 is preferably of large enough diameter to extend transversely far enough beyond the sides of shank 20 to serve as a lower hood stop to thereby prevent hood 18 from disengaging from hook 16 in the downwardly direction.

Hook assembly 10 also includes a downwardly open hood 18 which surrounds hook shank 20 and slides up and down along the length of the shank. Hood 18 has a central collar portion 32 having an inside diameter large enough to loosely encircle shank 20 and a skirt portion 34 flaring downwardly and outwardly from collar portion 32 to form the hood in the shape of a truncated, right cone of a diameter approximately twice as large as the width W of hook curved end 24. As shown in FIG. 2, skirt portion 34 extends downwardly far enough to cover the top of bag 12 to thereby prevent rain, dust and other foreign matter from falling into the bag. Ideally both the upper edge of hood collar portion 32 and the lower edge of skirt portion 34 are rounded to eliminate any sharp edges which could accidentally cut the user or bag 12 itself as it sways in the wind.

Hood 18 is illustrated in FIGS. 1–3 as constructed from rigid material, such as metal or plastic, with preferably a smooth, slippery outer surface to thereby prevent the hood from serving as a perch for birds, rodents or other animals. Although hood 18 is shown as having the shape of a truncated, right cone, the hood can be formed in other shapes, such as a pyramid, and still serve its function.

An elongate, downwardly open socket 36 extends along the exterior slope of skirt portion 34 of hood 18. Socket 36 is circular in cross section and extends substantially the entire length of skirt 34. The upper end of socket 36 is closed off while its lower end terminates at an opening 38 which is substantially flush with the lower edge of skirt 34. For simplicity of manufacture, preferably socket 36 is integrally formed with and is made from the same type of material as used to form hood 34. The inside diameter of socket 36 is formed large enough to receive the upper end of pole 39 which is used to lift hood 18, and thus hook assembly 10 itself, upwardly. Pole 39 can be any variety of conveniently available items including a walking stick, tree limb, tent pole, ski pole, ice-axe handle, or even a back pack frame. Accordingly, ideally the inside diameter of socket 36 is in the range of approximately $\frac{3}{4}$ to $1\frac{1}{2}$ inches. It will be understood that socket 36 may alternately be positioned on the inside surface of hood 34 without deviating from the intended scope of this invention.

Hook assembly 10 further includes a lock mechanism 22 designed to prevent hook 16 from disengaging from limb 14 even if bag 12 is violently swung by the wind. Lock mechanism 22 is composed of an elongate, narrow tongue member 40 which nominally closes off the opening of hook 16. The lower end of tongue member 40 is fixedly attached to a lower portion of shank 20 by any convenient means, such as a pair of spaced apart rivets 42 which extend through aligned holes provided in the tongue member and the shank. Tongue member 40, which is secured to the side of shank 20 facing hook tip 28, is nominally curved to extend upwardly from its point of attachment with shank 20 to terminate at an upper end portion 44 disposed adjacent tip 28 to thereby close off hook 16. If limb 14 is tossed up and down relative to hook assembly 10 by, for instance, a stiff wind, upward movement of hook 16 relative to limb 14 is limited by tongue member 40 which presses against the lower inside surface of hook tip 28 to prevent the hook from disengaging from limb 14.

When hood 18 is slid upwardly along shank 20, for instance, during the process of engaging hook assembly 10 with limb 14 as discussed more fully below, the inside diameter of collar 32 pushes against tongue member 40 thereby straightening the nominally curved tongue member and causing it to lie adjacent surface of shank 20. It will be appreciated that forming shank 20 in a straight line only requires tongue member 40 to assume a generally straight shape when hood 18 is slid upwardly along shank 20, so that tongue member 40 is not overbent in the direction opposite from its nominally curved orientation. As a consequence, the likelihood that tongue member 40 will fail from being fatigued is reduced.

Ideally tongue member 40 is constructed from a tough, durable material which can be readily formed in a curved shape and then repeatedly straightened without failing from fatigue. One such type of material is spring steel. Also, preferably tongue 40 is thin enough to require that the inside diameter of hood collar 32 be formed only slightly larger than the diameter of shank 20 while still enabling hood 18 to slide freely up and down the shank.

The hook assembly 10 illustrated in FIGS. 1–3 can be readily manufactured and assembled in several different ways using common methods and techniques. For instance, hook 16 of assembly 10 could be formed with a curved end 24 and a lug 27, and then lock 22 assembled with hook 16. Thereafter, hood 18 could be slipped over hook shank 20 and lastly eye 26 attached to the bottom of shank 20, for instance by the use of an adhesive or by welding. Eye 26 need not be entirely closed, as shown in FIGS. 2 and 3, but instead can be formed at the bottom of hook shank 20, after hood is in place, by using a common forming jig. As an alternative manner of manufacturing hook assembly 10, lug 27 could be formed or attached (for instance, by welding) to shank 20 after the assembly of hood 18 over hook curved end 24 and the forming of eye 26.

To use hook assembly 10 to hang containers, such as bag 12, from an overhead support, such as tree branch 14, the bag is first attached to the hook assembly by threading one end of cord 30 through eye 26 and then tying the ends of the cord together so that the bag is located closely below hook 16, as shown in FIGS. 2 and 3. Next, the upper end of whatever type of member is used as pole 39 is engaged upwardly into socket 36. Thereafter, the hook assembly 10 is simply lifted upwardly by pole 39 and hook 16 placed over limb 14. It will be appreciated that this operation only requires the use of one hand so that, if needed, the other hand is free to direct a flashlight or lantern toward the hook assembly.

When hook assembly 10 is raised upwardly, hood 18 automatically slides upwardly along shank 20 until it abuts against the stop 27. As hood 18 moves upwardly along shank 20, collar 32 pushes tongue member 40 towards shank 20 to thereby swing tongue upper end 44 away from hook tip 28 so that hook curved end 24 can be lowered over branch 14. Once hook assembly 10 is emplaced, pole 39 is simply removed from socket 36 thereby allowing tongue member 40 to resume its nominally curved shape to close off the opening of hook 16. As tongue member 40 returns to its nominally arcuate shape, it automatically causes hood 18 to slide downwardly along shank 20 and bottom against eye 26, as illustrated in FIG. 2. It will be appreciated that once hook assembly 10 has been placed around limb 14, the hook assembly is securely held in place by lock mechanism 22 to thereby prevent bag 12 from accidentally dropping to the ground and damaging, or otherwise ruining its contents.

It will be appreciated that besides functioning as a lock opening mechanism, hood 18 also serves as a shield to prevent rain, dust, or any other unwanted substance from entering the bag. Birds, rodents and other animals are prevented from reaching bag 12 by the smooth, slippery outer surface of hood 18 which causes the animals to slide off the hood. It will moreover be recognized that hook assembly 10, as described above, is of compact construction and, thus, does not occupy a significant volume of space in the typically cramped interior of a backpack.

To lower bag 12 from limb 14, the end of pole 39 is first placed within socket 36 and then the pole is raised upwardly to lift hook 16 off of limb 14. As pole 39 is lifted, hood 18 slides upwardly along shank 20 until abutting against stop 27. The upward movement of hood 18 automatically swings tongue member 40 away from hook tip 28 and against shank 20 to thereby open hook 16 so that it can be removed from branch 14. Once hook 16 is free from limb 14, hook assembly 10 and bag 12, depending therefrom, are simply lowered to the ground. It will be appreciated that forming hook curved end 24 with a depth D greater than a width W provides adequate clearance between tongue upper end 44 and limb 14 to permit the tongue to swing past the limb without any interference therewith.

Rather than being limited to only hanging food bags from tree limbs, hook assembly 10 of the present invention can be used to connect other types of members with remotely located supports. For instance, hook assembly 10 can be used to conveniently attach tarps or clotheslines to tree limbs.

An alternative embodiment of a hook assembly 100 typically constructed according to the present invention is illustrated in FIG. 4 as suspending a bag 102 from an overhead structure, such as tree limb 104. Hook assembly 100 includes a hook 106 composed of a curved, upper end section 108 and downwardly extending, elongate straight shank section 110 interconnected together by an intermediate, diagonal section 111. Rather than extending downwardly along a line disposed tangentially to curved end 108, shank section 110 is substantially aligned with the center of the curved section. A circular eye member 112 is integrally formed with the lower end of shank section 110 for receiving the central portion of an elongate cord or line 114 which extends around the upper end of bag 102. The ends of line 114 are wrapped around the upper end of bag 102 which has been bunched together, and then tied together to attach the bag securely to hook assembly 100.

Although bag 102 can be formed from any convenient material, ideally it is constructed from odor impermeable material such as plastic, to prevent animals, such as bears, from being attracted to the food located inside. Applicant has found that two plastic bags, such as commonly available garbage bags, one inside the other, function well as a food bag.

Rather than threading the central portion of line 114 through eye 112 in the manner illustrated in FIG. 4, one end of the line can be engaged through the eye and then the line wrapped around bag 102 several times and tied together. If this method of engaging line 114 with hook 106 is used, the ends 116 of the line can be enlarged to prevent line 114 from disengaging from eye 112 and becoming accidentally lost. This will ensure that line 114 will always be available when needed.

Hook assembly 100 also includes a hood 118 which serves as a cover to prevent rain and wind from entering bag 102. Hood 118 is constructed very similarly to hood 18, described above and, accordingly, includes a collar portion 120 which closely, slidably encircles shank section 110 and a downwardly open skirt portion 122 which flares downwardly and outwardly from collar portion 120. Upward travel of hood 118 along hook 106 is limited by a stop member in the form of opposed lugs 124 which extend transversely outwardly from the portion of shank section 110 located near the intersection of the shank section and intermediate section 111. Hood 118 is prevented from downwardly disengaging from hook 106 by eye 112, which eye extends transversely beyond the diameter of hook shank 110. As with hood 18, preferably hood 118 also has a smooth outer surface which is too slippery for birds and other rodents to use as a path for reaching bag 102.

Hook assembly 100 is engaged with, and removed from, limb 104 in somewhat the same manner as hook assembly 10, described above. However, rather than utilizing a socket, such as socket 36, for receiving the end of a pole 126 when raising and lowering hook assembly 100, pole 126 is inserted directly within hood 118. The conical shape of skirt portion 122 serves as a large receptacle for pole 126 to thereby maintain the pole engaged with hood 118. Once pole 126 is inserted within hood 118, hook assembly 100 is conveniently raised up and placed around tree limb 104. Thereafter, pole 126 is removed from hood 118 so that the hood is free to slide downwardly along shank section 110 to rest against eye 112 or the top of bag 102. To remove bag 102 from limb 104, the above procedure is simply reversed.

It will be appreciated that hook assembly 110 provides a very simple apparatus for suspending containers, such as food bag 102 from an overhead limb out of the reach of deer, bear, and other wildlife. As with hook assembly 10 illustrated in FIGS. 1–3, hook assembly 100 can be safely engaged with and removed from a remotely located tree limb with the use of only one hand.

A further typical hook assembly 200 constructed according to the present invention is illustrated in FIG. 5. Hook assembly 200 is essentially identical to hook assembly 100 illustrated in FIG. 4, with the exception that hood 202 of hook assembly 200 is constructed from heavy, durable, flexible material, such as heavy polyethylene or rubber coated canvas. Forming hood 202 from either of these materials enables the hood to collapse during storage so that it occupies less space than if the hood were constructed from a rigid material. Although not essential, if desired, the collar portion 204 of hood 202 can be reinforced with an inner or outer metal sleeve, not shown, bonded or otherwise attached to the collar portion. Hook assembly 200 is engaged with, and removed from, a remotely located, overhead structure, such as tree limb 206, in the same manner as hood assembly 100, described above.

In the hook assemblies 100 and 200 illustrated in FIGS. 4 and 5, respectively, the hooks can be initially formed with a curved end 108 and eye 112, but without opposed lugs 124. Thereafter, hood 118 or 122 could be assembled on hook 106 by sliding the hood over curved end 108. Next, opposed lugs 124 could be formed on hook shank 110 by a simple up setting procedure if the shank is made from metal or by up setting together with heat if the shank is made from plastic material.

As will be apparent to those skilled in the art to which it is addressed, the present invention may be embodied in specific forms and in embodiments other than those specifically here disclosed, without departing from the spirit or essential characteristics of the invention. The particular embodiments of the hook assemblies 10, 100 and 200, described above are, therefore, to be considered in all respects as illustrative and not restrictive, i.e., the scope of the present invention is as set forth in the appended claims rather than being limited to the examples of the hook assemblies set forth in the foregoing description.

I claim:

1. A hook assembly for attaching a container, line or other object to a support member, said hook assembly comprising:
   a hood having an arcuate upper end section and an elongate shank section extending downwardly from said arcuate upper end section;
   a hood having a central opening for slidably receiving said shank section to enable said hood to slide along said shank section, said hood being open in the downwardly direction;
   upper hood stop means for limiting the upward sliding movement of said hood toward said hook arcuate upper end section;
   lower hood stop means for preventing said hood from downwardly disengaging from said hook shank section;
   connecting means for connecting the lower end portion of said hook shank section to the container, line or other object; and,
   wherein said hood includes:
   a central collar having an inside opening of a width slightly larger than the width of said hook shank section;
   a skirt flaring outwardly from said central collar in the downward direction,
   said skirt extending longitudinally downward beyond said hook shank section when said hood is restrained by said lower hood stop means; and,
   a socket member extending along said hood skirt, said socket having an opening in the direction opposite said hook curved end section for receiving the end of a pole, stick or similar member thereby to slide said hood upwardly along said shank section to abut against said upper stop means to enable said hook assembly to be lifted upwardly and to be engaged with a remotely located support member.

2. The hook assembly according to claim 1, wherein said hood is constructed from smooth, rigid material.

3. A hook assembly according to claim 1, wherein said hood skirt is constructed from tough, flexible material.

4. A hook assembly according to claim 1, wherein said socket is integrally formed with, and disposed longitudinally along said hook skirt.

5. A hook assembly according to claim 1, wherein said upper stop means includes a lug section extending transversely outwardly from said shank section.

6. A hook assembly according to claim 1, wherein said connecting means includes an eye member fixedly attached to said shank section, said eye member extending transversely outwardly from said shank section to also serve as said lower stop means.

7. A hook assembly according to claim 6, further comprising a flexible, elongate line extending through said eye member, said line member having enlarged end portions of a width larger than the opening of said eye member to prevent said line from disengaging from said eye member.

8. A hook assembly for attaching a container, line or other object to a support member, said hook assembly comprising:
   a hook having an arcuate upper end section and an elongate shank section extending downwardly from said arcuate upper end section;

a hood having a central opening for slidably receiving said shank section to enable said hood to slide along said shank section, said hood being open in the downwardly direction;

upper hood stop means for limiting the upward sliding movemer of said hood toward said hook arcuate upper end section;

lower hood stop means for preventing said hood from downwardly disengaging from said hook shank section;

connecting means for connecting the lower end portion of said hook shank section to the container, line or other object; and, a lock for maintaining said hook attached to a support member, said lock including an elongate, nominally curved, resilient tongue member, said tongue member:

having a first end portion fixedly attached to said shank section at a location below said hook arcuate upper end section and a second end portion extending upwardly toward said hook arcuate upper end section; and, being shiftable between said hook closed position when said tongue second end portion is disposed adjacent the tip of said hook curved end member opposite said shank, and a hook open position wherein said tongue second end portion is disposed adjacent said hook shank section by the sliding movemer of said hood along said shank section toward said upper stop means.

9. A hook assembly according to claim 8, wherein the tip of said hook extends substantially parallel to said hook shank section a distance sufficient to form said hook curved section with a depth greater than its width.

10. A hook assembly according to claim 8, wherein said hood further includes a socket having an open end in the downward direction, said socket sized to slidably receive the end of a pole, stick or similar item to permit engagement of said hook with a distally located support member.

* * * * *

UNITED STATES PATENT AND TRADEMARK OFFICE
CERTIFICATE OF CORRECTION

PATENT NO. : 4,523,357
DATED : June 18, 1985
INVENTOR(S) : H. Robert Widditsch

It is certified that error appears in the above-identified patent and that said Letters Patent is hereby corrected as shown below:

| | | |
|---|---|---|
| Title page, | Item [54] | insert "HOODED" before "HOOK" |
| Column 2, | Line 1, | "elongated" should be --elongate-- |
| Column 3, | Line 23, | "head" should be --hood-- |
| Column 3, | Lines 34/35 | "illustrative" should be --illustrative,-- |

Signed and Sealed this

Twenty-fifth Day of February 1986

[SEAL]

Attest:

DONALD J. QUIGG

Attesting Officer

Commissioner of Patents and Trademarks